US005681898A

United States Patent [19]
Pocklington

[11] Patent Number: 5,681,898
[45] Date of Patent: Oct. 28, 1997

[54] GOLF BALL AND METHOD OF MANUFACTURE

[76] Inventor: Terence W. Pocklington, 2503 Savery Dr., Tupelo, Miss. 38801

[21] Appl. No.: 689,785

[22] Filed: Aug. 14, 1996

[51] Int. Cl.$^6$ .......................... A63B 37/00; A63B 37/06; A63B 37/12; C08L 9/00

[52] U.S. Cl. .......................... 525/193; 525/221; 473/373; 473/374

[58] Field of Search .................................. 473/373, 374; 525/193, 221

[56] References Cited

U.S. PATENT DOCUMENTS 3,658,635  4/1972  Eustice .
4,781,383  11/1988  Kamada .................................. 473/374
5,407,998  4/1995  Horiuchi ................................. 525/193

Primary Examiner—David Buttner
Attorney, Agent, or Firm—Rudnick & Wolfe

[57] ABSTRACT

A golf ball of the type comprising a solid core and a cover. The core is comprised of a rubber composition, and the cover is comprised an ionomer resin. There is a layer intermediate the core and cover, and the layer is comprised of a first component comprising a blend of n-butyl acrylate and ethylene methacrylic acid copolymer, and a second component is comprised of a vulcanizate with the vulcanizate being formed from polybutadiene and a peroxide curing agent.

13 Claims, No Drawings

GOLF BALL AND METHOD OF MANUFACTURE

BACKGROUND OF THE INVENTION

This invention relates to a golf ball having an improved composition which imparts to the ball ideal playing properties along with cut and abrasion resistance. The invention also relates to a method for manufacturing such balls.

For many years the most popular golf balls were formed of three pieces comprising a liquid center, a surrounding thread winding, and a cover made of balata or balata blends. Such balls were preferred by relatively skilled players because they had a very soft feel and a subdued sound. Furthermore, the relative softness of the cover material allowed the player to apply a spin to the ball to control the ball in flight and on the green.

Such balata covered balls were disadvantageous, however, in that they had low tear resistance and were easily cut in play. Balata covered balls, therefore, had a relatively short life span.

To overcome these deficiencies, golf balls manufactured in more recent years have included a primarily polybutadiene core with covers selected from a family of ionomers. The most popular ionomers are those sold by E.I. dupont de Nemours & Company under the trademark SURLYN.

U.S. Pat. No. 4,884,814, issued Dec. 5, 1989 to Sullivan, discloses an example of a ball of this type. In this case, the ball consists of a two-piece golf ball having a cover comprising a blend of a hard ionomer resin and a soft ionomer resin. U.S. Pat. No. 4,911,451, issued Mar. 27, 1990 to Sullivan, et al., discloses another example wherein a two-piece golf ball is made having a cover comprising blends of zinc or sodium neutralized ethylene-acrylic acid copolymers.

Although the two-piece structures referred to have proven to be quite popular, variations have been proposed for purposes of improving performance while retaining the cut-resistant character. Egashira Pat. No. 5,439,227 suggests a three-piece piece combination of a rubber inner core, a thermoplastic outer core of relatively low hardness, and an ionomeric outer cover of greater hardness. Yamagishi et al Patent No. 5,452,898 also proposes a three-piece combination comprising a two-piece core and a cover.

Another three-piece concept is disclosed in Dennis Pat. No. 4,431,193 wherein two ionomeric cover layers are formed over a solid a core. A harder ionomer is used for the inner layer and a softer ionomer for the outer layer. UK patent application No. 2,248,067 teaches a three part structure which takes the opposite approach by suggesting that the intermediate layer be softer than the cover layer.

The golf balls described in the prior art generally have improved cutting resistance when compared with balata covered balls. In addition, and particularly where high modulus ionomers are used, high initial velocities are generated. Such balls, however, tend to have a harder "feel" and also varying properties with regard to playability and coefficient of restitution. Accordingly, although the ionomeric covers, whether used in two-piece or three-piece contexts, are extremely popular because of their virtual indestructibility, they do not provide a totally satisfactory spin rate, suitable "feel", or controllability from the standpoint of the most skilled golfers. In many cases, therefore, the three-piece balata covered balls are still favored by better players.

SUMMARY OF THE INVENTION

This invention provides a three-piece golf ball having an improved composition which imparts the playability characteristics desired by a skilled player while at the same time retaining excellent cut resistance and overall durability. The invention specifically comprises such a golf ball and the method of manufacturing such a golf ball.

This ball, in particular, consists of a core of standard composition, a unique intermediate cover layer, and an outer cover layer which may comprise one of many available ionomeric compositions. The intermediate cover layer comprises a very resilient, relatively soft composition capable of transmitting energy through to the core upon impact with a golf club. Thus, the intermediate layer with increased resilience results in a ball of highly satisfactory overall distance potential. In addition, the resilience of the intermediate layer provides a highly suitable "feel" for the player and very effective control for shot performance.

The unique intermediate layer is formed of a first component, present in an amount from 50 to 75 percent by weight, preferably 60–70 percent, comprising a blend of 40 to 60 parts n-butyl acrylate and 40–60 parts ethylene methacrylic acid copolymer. Preferably, about equal parts of these ingredients are employed.

A second component, present in an amount from 25 to 50 percent, preferably 30–40 percent, comprises a vulcanizate of polybutadiene and a peroxide vulcanizing agent, with or without zinc diacrylate or methacrylate and/or zinc oxide additives. This component preferably contains 4 to 10 parts of peroxide, up to 20 parts of the zinc diacrylate or methacrylate, and up to 5 parts of the zinc oxide. The component is provided in a fine powder form (20–40 mesh) before mixing with the first component.

The core will typically be from 1.36 to 1.50 inches in diameter, preferably 1.40 to 1.45 inches. The intermediate layer component mixture is molded around the core to a thickness of 0.055 to 0.080 inch, preferably 0.065 inch. An outer cover of approximately the same thickness, e.g., a Surlyn cover, is then molded around the intermediate layer.

An intermediate layer made in accordance with the invention will have a low Shore D hardness of 38–48. A typical ionomer cover hardness is 70 Shore D but this figure will vary in accordance with the many available options for the cover material. Such options may include those described in the prior art and also new concepts.

DETAILED DESCRIPTION OF THE INVENTION

The golf balls of the invention are produced using standard choices for the core composition. As a non-limiting example, the core may comprise a rubber composition including a polybutadiene polymer having at least 40% of cis −1.4 bonds, as a principal ingredient, a crosslinking agent such as zinc diacrylate late, an inorganic filler such as zinc oxide, and a peroxide curing agent.

The core is molded to a diameter in the order of 1.36 to 1.50 inches, preferably about 1.40 to 1.45 inches. The intermediate and outer layers are formed over the core to achieve a final ball diameter between 1.68 and 1.72 inches. The final ball diameter is maintained at the lower dimension by virtue of USGA regulations and the higher dimension is the maximum employed commercially.

The intermediate layer comprises a two-component mixture with the first component comprising a blend of n-butyl acrylate and ethylene methacrylic acid copolymer. These ingredients are not crosslinked, that is, a cross linking agent such as methacrylic acid is not used in combination with this blend. The ingredients of the blend without the crosslinking agent are sold commercially under the brand name Nucrel by du Pont. Specifically ly, Nucrel RX9-1 comprises a suitable n-butyl acrylate and Nucrel 925 or 960 comprise suitable ethylene methacrylic acid copolymer.

The second component comprises a vulcanizate of a polybutadiene polymer and a peroxide vulcanizing agent. Zinc diacrylate or methacrylate and/or zinc oxide may be included as part of the second component.

In the formation of the intermediate layer, the Nucrel components are typically supplied in pellet form. The pellets are introduced to a conventional Banbury mixer and roll mill which results in formation of a thin film of material.

The vulcanizate is reduced to powder form, 20–40 mesh, before addition to the Nucrel blend, and the equipment disperses the powder uniformly throughout the Nucrel blend. The mill discharges a sheet of material which is adapted to be pelletized, molten and then fed to injection molding equipment for formation about the core. Thereafter, the outer or cover layer is molded about the intermediate layer.

The following comprise examples of intermediate layer compositions found suitable for the practice of the invention:

| | |
|---|---|
| n-butyl acrylate (Nucrel RX9-1) | 50 parts |
| ethylene methacrylic acid copolymer (Nucrel 960) | 50 parts |
| a vulcanizate of polybutadiene (100 parts), zinc diacrylate (10 parts), zinc oxide (3 parts) and a peroxide vulcanizing agent (7 parts) | 50 parts |
| | 150 parts |

The vulcanizate was ground to a fine powder (20–40 mesh). Typically, the product is vulcanized to a slab form prior to grinding of the rubber to the desired particle size.

Using a Banbury mixer and roll mill, pellets of the Mucrel ingredients were melted on the mill. The vulcanizate powder was added and uniformly dispersed resulting in a sheet of material which was then granulated in conventional fashion in preparation for an injection molding operation.

A core consisting of polybutadiene, zinc diacrylate, zinc oxide and a peroxide curing agent, and having a diameter of 1.42 inches was employed. The intermediate layer comprising the Nucrel and vulcanizate was injection molded to a thickness of 0.065 inch. A cover comprising a 50—50 blend of surlyn 9120 and Surlyn 8140 was then molded, also to a thickness of 0.065 inches, around the intermediate layer resulting in a 1.68 inch diameter ball.

The intermediate layer had a Shore D hardness of 42 and high resilience (+60 percent rebound characteristic). The cover had a Shore D hardness of 72.

| | |
|---|---|
| Ethylene methacrylic acid copolymer | 50 parts |
| n-butyl acrylate | 50 parts |
| vulcanizate of polybutadiene polymer (100 parts) and peroxide vulcanizing agent (7 parts) | 50 parts |
| | 150 parts |

A ball produced otherwise in accordance with Example I and using this composition as the intermediate layer was characterized by an intermediate layer with a Shore D hardness of 42 and high resilience exemplified by a +60 percent rebound characteristic.

As noted, balls with these characteristics exhibited superior distance potential and controllability. These are the most critical factors in ball performance and this underscores the advance in ball design which this invention achieves.

It will be understood that various changes and modifications may be made in the concepts of the invention without departing from the spirit thereof particularly as defined in the following claims.

That which is claimed is:

1. A golf ball of the type comprising a solid core and a cover, said core comprising a rubber composition, and said cover comprising an ionomer resin, and including a layer intermediate said core and cover, said layer comprising a first component comprising a blend of n-butyl acrylate and ethylene methacrylic acid copolymer, and a second component comprising a vulcanizate, said vulcanizate being formed from polybutadiene and a peroxide curing agent.

2. A golf ball according to claim 1 wherein said vulcanizate further includes a compound selected from the group consisting of zinc oxide, zinc diacrylate and zinc methacrylate.

3. A golf ball according to claim 1 wherein said vulcanizate comprises from 25 percent to 50 percent by weight of the intermediate layer and said blend from 50 to 75 percent by weight.

4. A golf ball according to claim 3 wherein said vulcanizate comprises from 30 to 40 percent by weight and said blend from 60 to 70 percent by weight of said intermediate layer.

5. A golf ball according to claim 3 wherein said core is 1.36 to 1.50 inches in diameter, said intermediate layer is 0.055 to 0.080 inch in thickness, and said cover is 0.055 to 0.080 inch in thickness.

6. A golf ball according to claim 3 wherein said vulcanizate consists of 100 parts polybutadiene, from 4 to 10 parts peroxide curing agent, up to 20 parts of a component selected from the group consisting of zinc diacrylate and zinc methacrylate, and up to 5 parts of zinc oxide.

7. A golf ball according to claim 1 wherein said intermediate layer has a hardness of 38–48 Shore D.

8. A method for producing a golf ball of the type comprising a core composed of a rubber composition and a cover composed of an ionomer resin, the steps including forming a material comprising a first component comprising a blend of n-butyl acrylate and ethylene methacrylic acid copolymer and a second component comprising a vulcanizate of polybutadiene and a peroxide curing agent, and molding said material around said core to form a layer of the material intermediate the core and cover.

9. A method according to claim 8 wherein said vulcanizate further includes a compound selected from the group consisting of zinc oxide and zinc diacrylate.

10. A method according to claim 8 wherein said vulcanizate comprises from 25 percent to 50 percent by weight of the intermediate layer and said blend from 50 to 75 percent by weight.

11. A method according to claim 10 wherein said vulcanizate comprises from 30 to 40 percent by weight and said blend from 60 to 70 percent by weight of said intermediate layer.

12. A method according to claim 10 wherein said core is 1.36 to 1.50 inches in diameter, said intermediate layer is 0.055 to 0.080 inch in thickness, and said cover is 0.055 to 0.080 inch in thickness.

13. A method according to claim 8 wherein said vulcanizate consists of 100 parts polybutadiene, from 4 to 10 parts peroxide curing agent, up to 20 parts of a component selected from the group consisting of zinc diacrylate and zinc methacrylate, and up to 5 parts of zinc oxide.

* * * * *